June 21, 1960     C. L. GRAYBILL     2,941,420
REVERSIBLE TORQUE TRANSMISSION FOR POWER TOOLS
Filed Dec. 11, 1958     2 Sheets-Sheet 1

CLINTON L. GRAYBILL
INVENTOR.

BY *James A. Girman*
ATT'Y

June 21, 1960   C. L. GRAYBILL   2,941,420
REVERSIBLE TORQUE TRANSMISSION FOR POWER TOOLS
Filed Dec. 11, 1958   2 Sheets-Sheet 2

CLINTON L. GRAYBILL
INVENTOR.

BY James L. Givnan
ATT'Y

United States Patent Office 2,941,420
Patented June 21, 1960

2,941,420

REVERSIBLE TORQUE TRANSMISSION FOR POWER TOOLS

Clinton L. Graybill, Spokane, Wash., assignor to Graybill Industries, Inc., Superior, Mont., a corporation of Montana Filed Dec. 11, 1958, Ser. No. 779,771

3 Claims. (Cl. 74—764)

This invention relates generally to portable hand-manipulated power tools and more particularly to an instrumentality forming a driving connection between a pair of rotatable shafts, the primary object being to provide means for transmitting rotary motion to a driven shaft in either of two directions while the drive shaft rotates continuously in a single direction.

The tool proper which directly effects the work to be done and in connection with which the invention is hereinafter described is a thread-tapping tool, but other tools such as screw-driving bits, drills, reamers, boring tools or other tools operating by rotation may be utilized with equal effectiveness.

In tapping operations it is desirable to effect a steady application of driving power at speeds suitable to the tap and to the workpiece and without unduly increasing axial pressure at any time through the thread cutting operation. Conversely, it is desirable to similarly withdraw the tap from the threaded hole by reversing and without application of sufficient axial pressure such as might cause drag or distortion of the threads, particularly as the tap is backed out of the last turn or two of the finished threads.

Breakage of taps and damage to the workpiece itself is quite common, particularly where small taps are used. For safe and efficient operation, a tap of any size should be rotated three or four times in a thread-cutting direction, then reversed approximately the same number of turns before proceeding with the cutting to prevent the chips of the cut from clogging the tap flutes, which often results in tap breakage and damage to the work being dealt with.

Accordingly, one of the principal and most important objects of this invention is to provide a device capable of being interposed between a drive shaft, such as a shaft extending from a portable unidirectional power tool, and a driven shaft having a second chuck thereon for receiving a tap or analogous tool, the device in one form of embodiment of the invention being shiftable as a unit longitudinally relative to the axis of rotation of the shaft, and in another form the unit is divided into two selectively manually engageable sections whereby, in either case, to rotate the driven shaft in either of two directions.

A further object and equally important object of the invention is to provide a tool of the character described which can be quickly and conveniently coupled to the chuck of any standard make of unidirectional portable power unit and which, through the medium of either a handgrip or a mechanical grip, will properly and effectively drive the tap into a workpiece in one direction of rotation at a speed suitable to the tap and workpiece and with equal effectiveness, without stopping the power unit, instantly reverse the direction of rotation for the purpose above pointed out, or for removing the tap from the work when completed.

A still further object of the invention is to provide a tool of the character described which is of simple, efficient, compact, durable and economical construction, positive and foolproof in operation and containing a minimum number of parts readily accessible for inspection, repair and replacement.

The foregoing and other objects and advantages which will become subsequently apparent reside in the details of construction and operation as more fully hereinafter described and claimed, reference being had to the accompanying drawing forming a part hereof, wherein like numerals refer to like parts throughout and in which:

Figure 1 is a side elevational view of a reversible torque transmission made in accordance with my invention and with parts in section and fragments broken away for convenience of illustration.

Figures 2 and 3 are sectional end views taken respectively and approximately along the lines 2—2 and 3—3 of Figure 1.

Figure 1:
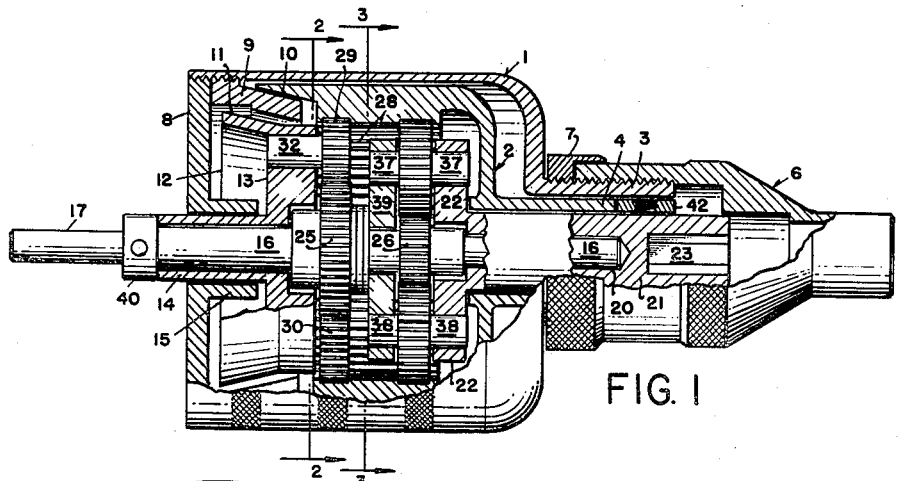
Figure 2:
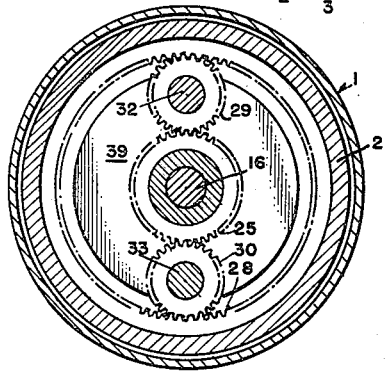
Figure 3:
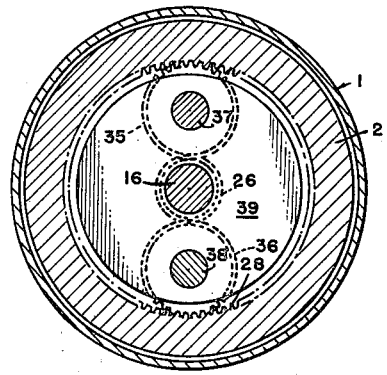

In the form shown in Figures 1 to 3 of the drawings, the reversible torque transmission of this invention is embodied in a power tool attachment comprising a first annular housing and a second annular housing, indicated generally by reference numerals 1 and 2 respectively and correlated for independent relative rotation and rectilinear movement. Each of said housings is in the form of a hollow cup shaped member integrated with a forwardly extending concentric hub 3 and 4 respectively. The hub 3 is provided with a finder indicated generally at 6 removably secured to the hub by a ring nut 7. From the foregoing, it will be apparent that the first housing 1 may be slid forwardly or rearwardly relative to the second housing 2.

The opposite end of the first housing 1 is closed by a disc, or end bell 8, which serves to lock in place within that end a fixed brake ring 9 whose outer peripheral surface is adapted to cooperate with a brake face 10 provided on the inner peripheral surface of the corresponding end of the second housing 2. The inner peripheral surface of the brake ring 9 is adapted for cooperation with the braking surface 11 on the outer peripheral surface of a second brake member 12 integrated with a planet carrier 13 provided with a hub 14 which is journaled within a bearing 15 integrated with the end bell 8. A drive shaft 16 is journaled within the hub 14 and extends outwardly therefrom and is reduced in diameter as at 17 for coupling with the chuck (not shown) of any standard portable unidirectional power tool such as an electric power drill, or the like.

The opposite end of the shaft 16 is also reduced in diameter and journaled within an axially aligned bore 20 in a shaft 21 integrated at its inner end with a planet carrier 22 and provided at its opposite end with a polygonal bore 23 to receive the shank (not shown) of a tap, screw driver bit, or any similar tool designed to operate in alternate directions of rotation.

Secured to the shaft 16, or cast and machined as an integral part thereof, are two spaced apart sun gears 25 and 26 of unequal diameters as shown. The second housing 2 also serves as a ring gear by the provision of gear teeth 28 on its inner periphery. Enmeshed at all times with the sun gear 25 and the ring gear 28 are two planet gears 29 and 30 (of lesser diameter than their sun gear) rotatably mounted to the carrier portion 13 of the brake member 12 by means of their respective stub shafts 32 and 33 (see also Fig. 2). Enmeshed at all times with the sun gear 26 (see also Fig. 3) and with the ring gear 28 are two planet gears 35 and 36 (of greater diameter than that of the planet gears 29 and 30 and that of their own sun gear 26) rotatably mounted by their respective stub shafts 37 and 38 to the carrier portion 22 of the shaft 21 and to a companion carrier in the form of a disc 39.

The shaft 16 and its related parts are held in proper working relationship to cooperating parts by means of a retaining collar 40 secured to said shaft. The second housing 2 is similarly held in relation to the carrier 22 and shaft 16 by means of a retaining ring 42 secured to the shaft 21.

With the parts in position as shown in Figure 1 and with the shaft 16 being driven in a clockwise direction as viewed in Figures 2 and 3 by a unidirectional power tool to which the shaft end 17 is coupled and with the second housing 2 (ring gear 28) being held stationary by engagement of the first brake member 10 with the brake ring 9 and because of the gear ratios above described, the planet gears 29, 30 and 35, 36 will be caused to orbit about their respective sun gears 25 and 26, causing the brake member 12 and carrier 13 to idly rotate in a clockwise direction about the shaft 16 while rotary movement in the same direction is transmitted to the shaft 21 through the medium of the planet carrier 22, planet gears 35, 36 and ring gear 28. Shifting the first housing 1 to the left will disengage the brake ring 9 from the first brake member 10 and engage the brake ring with the second brake member 12 and thereby lock the planet carrier 13 against rotation. The now released second housing 2 (ring gear 28), being driven in a counter-clockwise direction, will drive the planet carrier 39, 22 and shaft 21 in the same counter-clockwise direction. The relative speeds of clockwise and counter-clockwise rotation of the shaft 21 may, of course, be varied by varying the ratios of the gears in the gear trains just described. When a tap or analogous instrumentality carried by the chuck 23 is driven home in a workpiece by forward movement of the tool, abutment of the finder 6 with the workpiece and its resultant rearward movement relative to the shaft 21 by further forward movement of the tool will disengage the brake ring 9 from the first brake member 10 and, as a consequence thereof, stop rotation of the shaft 21. Further forward movement of the tool, and hence further rearward movement of the finder and first housing 1, will engage the brake ring 9 with the brake 12 to thereby impart counter-clockwise rotation to the shaft 21 and the instrumentality carried thereby.

Figure 4:
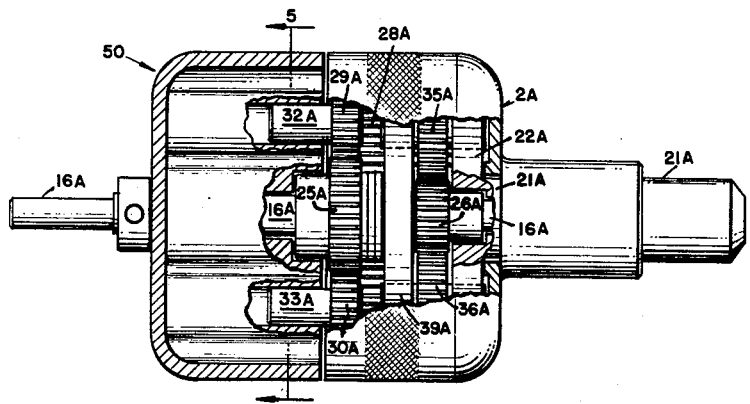
Figure 4 is a view similar to Figure 1 illustrating a modified form of the invention.
Figure 5:
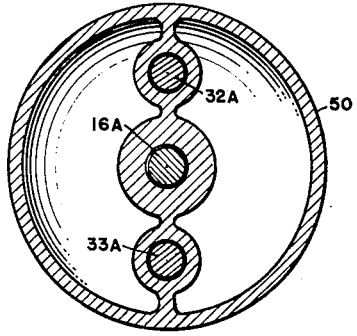
Figure 5 is a sectional end view taken along the line 5—5 of Figure 4.
Figure 7:
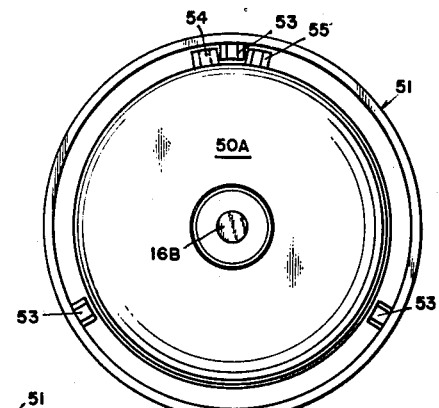
Figure 7 is a view of the left hand end of Figure 6 with the end bell thereof removed.

In the modified form of the invention shown in Figure 4 the second housing 2A is identical with the second housing 2 of Figure 1 except that the first brake member 10 thereof has been dispensed with. The planet gears 29A and 30A are carried by a first housing 50 by means of their stub shafts 32A and 33A respectively. When the second housing 2A is manually held against rotation and the shaft 16A is being driven in a clockwise direction by a unidirectional power tool to which it is coupled, the planet gears 29A, 30A and 35A, 36A will orbit about their respective sun gears 25A and 26A in a clockwise direction as the housing 50 idly rotates in the same direction about the shaft 16A and the shaft 21A is operatively driven also in a clockwise direction.

Upon releasing the housing 2A and gripping the housing 50 to hold it against rotation, the now released housing 2A will be driven in a counter-clockwise direction and, for the same reasons as pointed out in describing the operation of the form shown in Figure 1, will drive the planet gears 35A, 36A, their carrier 22A, 39A and shaft 21A in a counter-clockwise direction.

Figure 6:
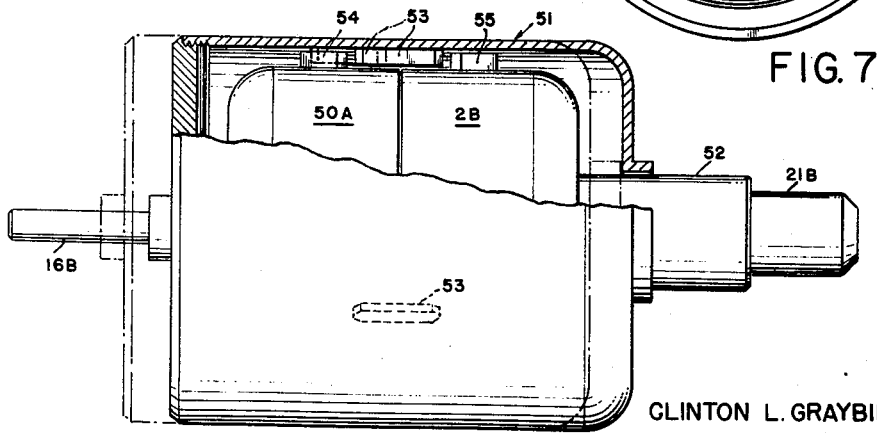
Figure 6 is a side elevational view of a further modification of the invention with fragments broken away to reveal internal parts and with two stages of operation indicated respectively by full and broken lines.

In the further modification as illustrated in Figure 6, and for convenience in manipulating the form of the invention of Figure 4, I place the unit within a cylindrical housing 51. This housing is slidably mounted on the hub portion 52 of the housing 2B and on the shaft 16B. The interior of the housing 51 is provided with circumferentially spaced apart lugs 53 adapted for selective engagement with external lugs 54 and 55 on the first and second housings 50A and 2B of the unit respectively. By this arrangement the first housing 50A can be locked against rotation to drive the shaft 21B in a counter-clockwise direction by moving the cylindrical housing 51 to the left as indicated by broken lines to engage one of the lugs 53 with the lug of the first housing 50A. Moving the housing 51 to the right will engage one of the lugs 53 with the lug 55 of the second housing 2B to lock it against rotation and thereby drive the shaft 21A in a clockwise direction, all in the same manner as when the first and second housings of Figure 4 are selectively manually held against rotation.

From the foregoing description it will be apparent that I have provided an instrumentality which is positive in tapping and backing out operations and requires but slight pressures to render it effective, and that these pressures are applied in the normal axial direction consistent with the entering and cutting and backing out of the tap, and that the speed ratios between the driving and driven elements may be varied by changing the diameters of the gears of one gear train relative to those of the other.

In actual practice, I have found that the action of the parts and the transmission of rotary motion to the driven shaft in either of two directions remains smooth over long periods of use, and that the device requires no adjustment or attention other than reasonable cleanliness and lubrication.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

1. An instrumentality forming a driving connection between a rotatable shaft and driven shaft to transmit rotary motion to the driven shaft in either of two directions during continuous rotation of the rotatable shaft, comprising in combination a housing, an internal ring gear integrated with the housing, a rotatable shaft extending into said housing, a driven shaft coaxial with the rotatable shaft and extending outwardly from the housing, a first and second sun gear secured to the rotatable shaft, a first planet carrier rotatably mounted on the rotatable shaft and provided with planet gears enmeshed with said first sun gear and with said ring gear, a second planet carrier integrated with said driven shaft and provided with planet gears enmeshed with said second sun gear and with said ring gear, said first planet carrier and said housing each adapted to be selectively individually held against rotation relative to the other, whereby when the housing is held stationary, rotation will be imparted through said second sun gear, its respective planet gears and second planet carrier to the driven shaft in one direction, and whereby when the first planet carrier is held stationary, rotation will be imparted through said first planet gears, ring gear, second planet gears and second planet carrier to the driven shaft in an opposite direction.

2. An instrumentality forming a driving connection between a rotatable shaft and a driven shaft to transmit rotary motion to the driven shaft in either of two directions during continuous rotation of the rotatable shaft, comprising in combination a hollow first housing, a rotatable shaft extending into said first housing, a second hollow housing rotatably mounted within the first housing, said first housing being slidable relative to said second housing, cooperating brake members carried by both of said housings and adapted for selective engagement and disengagement upon movement of said first housing relative to said second housing, a first driving mechanism interconnecting said rotatable shaft with said second housing, a second driving mechanism interconnecting said rotatable shaft with said second housing and the second housing with said driven shaft, and brake means carried by said first driving mechanism adapted for engagement with the brake member of the first housing upon its disengagement from the brake member of the second housing whereby to reverse the direction of rotation of said driven shaft through the medium of said second driving mechanism.

3. For use with a power tool, a power attachment comprising a first housing having opposing closed ends and adapted at one of its ends for attachment to a tool chuck, a first rotatable shaft extending to the interior of said housing and journaled at its inner end within a second rotatable shaft coaxially aligned with said first shaft, one end of said second shaft adapted to receive a tool operated by rotation, a second housing concentrically disposed interiorly of said first housing slidably and rotatably mounted upon said second shaft and provided with a ring gear on its inner periphery, a first planet gear carrier rotatable about said first shaft and provided with planet gears enmeshed at all times with said ring gear and with a sun gear secured to and rotatable with said first shaft, a second planet gear carrier carried by said second shaft and provided with planet gears of greater diameter than said planet gears of the first planet carrier and enmeshed at all times with said ring gear and with a second sun gear carried by said first shaft and of lesser diameter than the first mentioned sun gear, means disposed within said first housing at one end thereof for selectively engaging said first planet carrier or said second housing to respectively hold either against rotation, whereby holding the second housing against rotation will cause the second planet carrier and its shaft to rotate in one direction, and releasing the second housing and holding the first planet carrier will cause the second planet carrier and its shaft to rotate in an opposite direction.

References Cited in the file of this patent

UNITED STATES PATENTS

| | | |
|---|---|---|
| 2,521,585 | Kurtz et al. | Sept. 5, 1950 |
| 2,863,334 | Babcock | Dec. 9, 1958 |